United States Patent [19]

Hickley et al.

[11] Patent Number: 4,926,656
[45] Date of Patent: May 22, 1990

[54] INTEGRATED WET BULB DEPRESSION AIR COOLER

[75] Inventors: Pieter John A. Hickley; Cornelius J. Claassen, both of Transvaal Province, South Africa

[73] Assignee: Aztec Sensible Cooling, Inc., Albuquerque, N. Mex.

[21] Appl. No.: 373,489

[22] Filed: Jun. 30, 1989

[30] Foreign Application Priority Data

Jan. 11, 1989 [ZA] South Africa .................. 890209

[51] Int. Cl.$^5$ .............................................. F28D 5/00
[52] U.S. Cl. ............................................ 62/310; 62/304
[58] Field of Search ............... 62/304, 309, 311, 171, 62/93, 94

[56] References Cited

U.S. PATENT DOCUMENTS

| | | |
|---|---|---|
| 1,986,529 | 1/1935 | Ray . |
| 2,069,359 | 2/1937 | Dudley . |
| 2,211,886 | 8/1940 | Dudley .......................... 62/95 |
| 2,256,940 | 9/1941 | Crawford ...................... 62/309 |
| 3,116,612 | 1/1964 | Pennington ............... 62/311 X |
| 3,521,460 | 7/1970 | Knowles ........................ 62/95 |
| 3,905,205 | 9/1975 | Zusmanovich .................. 62/95 |
| 3,923,935 | 12/1975 | Cates ............................ 261/159 |
| 3,994,999 | 11/1976 | Phelps ........................... 261/159 |
| 4,076,771 | 2/1978 | Houx, Jr. et al. ............ 261/159 |
| 4,380,910 | 4/1983 | Hood et al. ..................... 62/95 |
| 4,478,767 | 10/1984 | Watanabe ...................... 62/310 |
| 4,532,777 | 8/1985 | Thompson ...................... 62/96 |
| 4,660,390 | 4/1987 | Worthington .................. 62/310 |

FOREIGN PATENT DOCUMENTS

| | | | |
|---|---|---|---|
| 1146237 | 3/1963 | Fed. Rep. of Germany | 62/310 |
| 794313 | 1/1981 | U.S.S.R. . | |
| 1109559 | 8/1984 | U.S.S.R. ...................... | 62/309 |

Primary Examiner—Henry A. Bennet
Attorney, Agent, or Firm—Dowell & Dowell

[57] ABSTRACT

A heat exchange process and apparatus for supplying cool air to a given location wherein a primary air stream is initially cooled by indirect heat exchange with a recirculating working fluid and thereafter evaporatively cooled by direct heat exchange with the working fluid flowing through a primary humidifying and cooling chamber. The working fluid is initially cooled in at least secondary, and preferably a secondary and intermediate, humidifying and cooling chamber by air streams which are separate from the primary air stream.

16 Claims, 2 Drawing Sheets

1

INTEGRATED WET BULB DEPRESSION AIR COOLER

This invention relates to a heat exchange process and apparatus wherein a supply or stream of air is cooled utilizing, in the preferred embodiment, three air streams to obtain one stream of usable air suitable for external cooling purposes. The process passes secondary air through a first humidifying and cooling chamber which is in heat exchange relation to a working fluid thereby causing cooling of the working fluid and humidification and cooling of the secondary air. An intermediate air stream is initially passed through a sensible or indirect cooling apparatus and thereafter through a second humidifying and cooling chamber which are both in further heat exchange relationship to the working fluid downstream of the first humidifying and cooling chamber thereby causing further cooling of the working fluid which is passing therethrough while simultaneously heating the working fluid which is being recirculated in the sensible cooling apparatus. Thereafter, a primary air stream passes through the sensible or indirect cooling apparatus and through a third or primary humidifying and cooling chamber which are both in heat exchange relationship to the working fluid causing the working fluid to be cooled in the cooling and humidifying chamber and heated in the sensible indirect cooling apparatus as the working fluid is recycled to the first humdifying and cooling chamber with the primary air being cooled both by the sensible cooling apparatus and the cooling and humidifying chamber.

Further, according to the invention, there is provided a cooling apparatus which includes a first air chamber housing an evaporative cooling media pack in heat exchange relationship with the secondary air and which includes an inlet and an outlet for the secondary air flow as well as a sprayer for introducing the working fluid therein. An intermediate or second air chamber housing is provided which incorporates a sensible or indirect cooling coil as well as an evaporative cooling media pack both of which are in heat exchange relation with the intermediate air stream and working fluid. The second air chamber includes an inlet and outlet for the intermediate air as well as an inlet and outlet for the working fluid. A primary or third air chamber housing is also provided and includes a sensible or indirect cooling coil as well as an evaporative cooling media pack both of which are in heat exchange relation with the primary air as well as the working fluid which is received from the second air chamber. The primary air chamber has an inlet and outlet for the primary air and inlet and outlet for the working fluid. The apparatus of the above description may include a common evaporative cooling media pack which is in heat exchange relation with the secondary, intermediate and primary air streams and through which the working fluid successively passes thus causing cooling of the working fluid and simultaneous cooling and humidification of the secondary, intermediate and primary air streams. Also, a sensible cooling coil may be in heat exchange relation with the intermediate and primary air streams in which the working fluid is recycled to the first air chamber thus causing cooling of the intermediate and primary air streams and simultaneous heating of the working fluid. Air may be introduced into the apparatus by means of a single blower or, alternately, two blowers may be utilized, one for conveying the primary air through the apparatus and the second for conveying the intermediate as well as the secondary air through the apparatus. In the event that the single blower is utilized this blower conveys all three air streams through the apparatus.

Further according to the invention, a cooling apparatus is provided which includes a distributor for distributing the working fluid (which may be water) onto the evaporative cooling media pack in the first air chamber. The working fluid passes through the media pack and is cooled in sequence by the secondary air stream, precooled intermediate air stream and finally the precooled primary air stream.

A sump is also provided for collecting the working fluid a the outlet of the primary air chamber evaporative cooling media pack and a pump circulates the working fluid from the collecting sump through the sensible cooling coil and discharges it through the distributor and onto the secondary air evaporative cooling media pack.

The flow of primary and intermediate air streams are separately controllably so as to provide for a varying ratio of primary to intermediate air through the use of an adjustable baffle which forms the boundary between the primary and intermediate air chambers.

BRIEF DESCRIPTION OF THE DRAWINGS

Two embodiments of the invention are described by way of example with reference to the accompanying drawings in which.

DESCRIPTION OF THE PREFERRED EMBODIMENT

Figure 2:
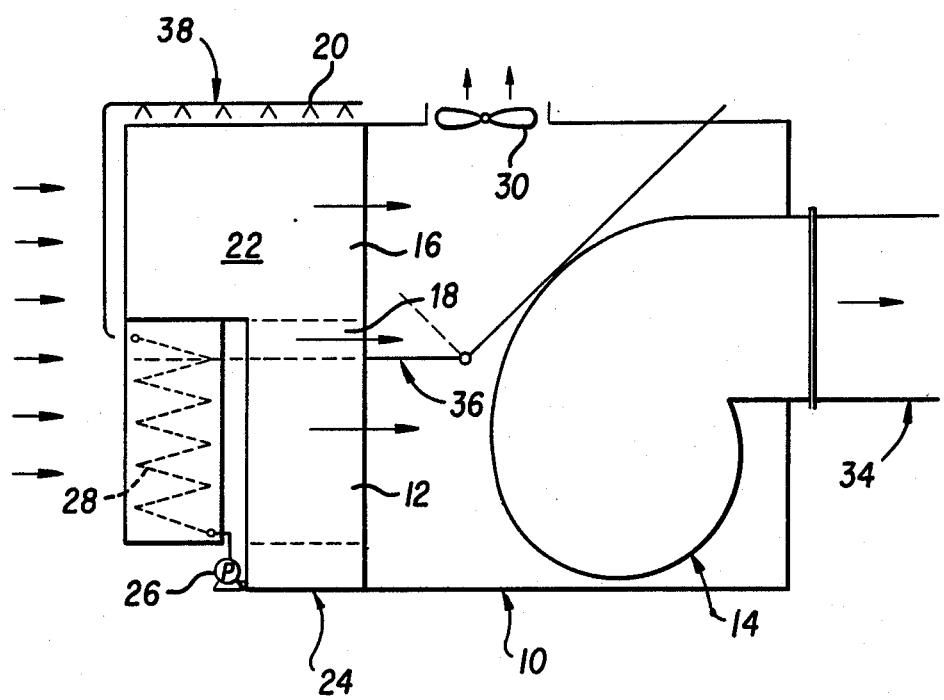

Referring to the drawings, reference numeral 10 generally indicates a cooling apparatus which includes a primary chamber 12 having an inlet for receiving air as conveyed by blower 32 or in the case of FIG. 2 primary air which is moved by primary blower 14 as well as secondary and intermediate air as moved by blower 30. Air in primary chamber 12 is defined as primary air and likewise air in intermediate chamber 18 is defined as intermediate air, and air in secondary chamber 16 is defined as secondary air. I order to control the ratio of primary air to air used as intermediate air in the intermediate chamber 18, a baffle 36 is provided.

The cooling apparatus includes a working fluid distributor pipe section 20 having a plurality of spray openings 20 therein. The distributor pipe is situated in the top section of the apparatus above a secondary air evaporative cooling media pack 22 and thus forms an inlet for the working fluid to evenly enter the secondary air evaporative cooling media pack 22. The evaporative cooling media pack which, in the preferred embodiment, extends across all three defined air streams (i.e. secondary, intermediate and primary air streams) is identified by numberal 22. A pump 26 is provided for recirculating the working fluid through a sensible or indirect cooling coil 28 from a collecting trough or sump 24 to the distributor.

Figure 1:
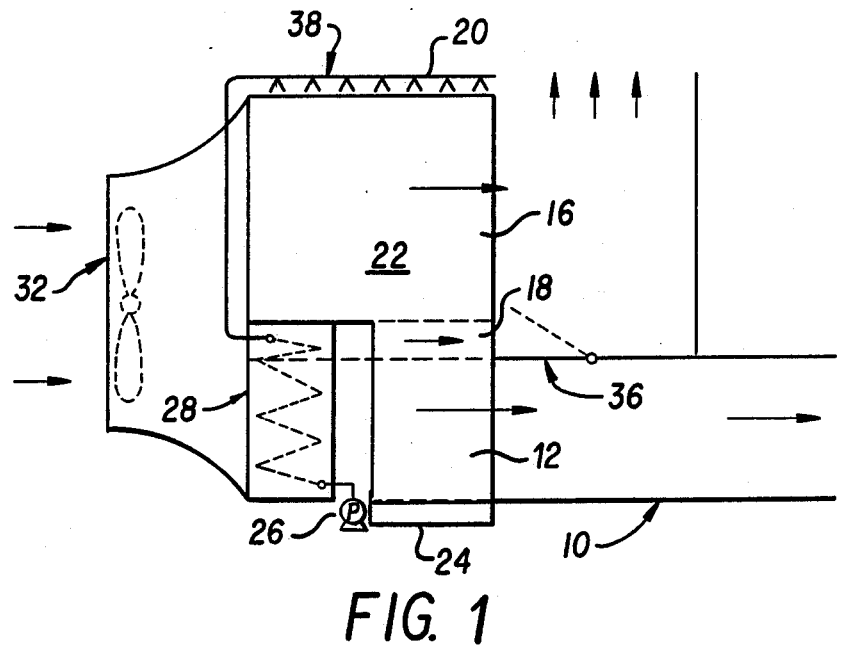
FIGS. 1 and 2 show schematic cross sectional views of two embodiments of a cooling apparatus in accordance with the invention.

In use, the secondary air stream passes through secondary air chamber 16 either by use of blower 32 in FIG. 1 or blower 30 in FIG. 2. The secondary air stream exchanges heat with the working fluid which enters the secondary chamber through distribution piping 38 and spray openings 20. During this heat exchange process the working fluid is cooled due to the evaporative cooling process that occurs in the evaporative cooling media pack situated in the secondary chamber 16 to a temperature that tends towards the wet bulb temperature of the air entering the secondary chamber.

In the intermediate air chamber 18 the intermediate air stream is first pre-cooled by the working fluid passing through the sensible or indirect heating cooling coil 28 and thereafter during the heat exchange process which occurs between the intermediate air and the working fluid inside the evaporative cooling media pack 22 situated in the intermediate chamber. It is now possible to obtain a temperature of the working fluid that is lower than the initial wet bulb temperature of the air as moved by the blowers through the intermediate and secondary air chambers.

In the primary air chamber 12 the primary air stream which is moved by blower 14 (FIG. 2) or blower 32 (FIG. 1) is first pre-cooled by the sensible cooling coil 28 thereby reducing the temperature of the primary air without the addition of moisture to the air stream. The primary air stream then passes in heat exchange relationship with the working fluid in the evaporative cooling media pack 22 inside primary air chamber 12. During this heat exchange process the primary air is cooled by evaporative cooling to a lower dry bulb temperature on account of the evaporation of the working fluid. Likewise, the working fluid temperature is reduced as it flows inside the evaporative cooling media pack from the entering position to the leaving position where the working fluid is collected in a collecting sump 24 for further use. Due to the reduced wet bulb temperature of the primary air stream from the pre-cooling by sensible cooling coil 28, the working fluid temperature can be reduced.

The primary air stream is then extracted from the primary air chamber by blower 14 (FIG. 2) or blower 32 (FIG. 1) and conveyed through ductwork 34 to a space downstream of the apparatus that may require cool air.

The working fluid now at a temperature approaching the wet bulb temperature of the primary air stream and which is collected in collection sump 24 is pumped by pump 26 through sensible cooling coil 28 and through distribution piping 38 and discharged through openings 20 from where it flows through evaporative cooling pack 22 and the cycle is repeated.

The heat exchange principle on which this invention is based is that the temperature of a hot working fluid is reduced in an evaporative cooling heat exchange process, first to a level approaching the wet bulb temperature of the air in contact with the fluid, then reduced further to a lower level by heat exchange in an evaporative cooling process with air at a lower wet bulb temperature. This reduced air wet bulb temperature is obtained by utilizing the working fluid to pre-cool such air to a lower dry bulb and thus automatically to a lower wet bulb temperature as no moisture is added to the air stream during the process.

The secondary and intermediate air which is mixed can be used to cool non critical areas depending on the application, but is mostly discharged to atmosphere and actually contains the equivalent amount of energy that became usable as the primary air cooling energy.

Figure 3:
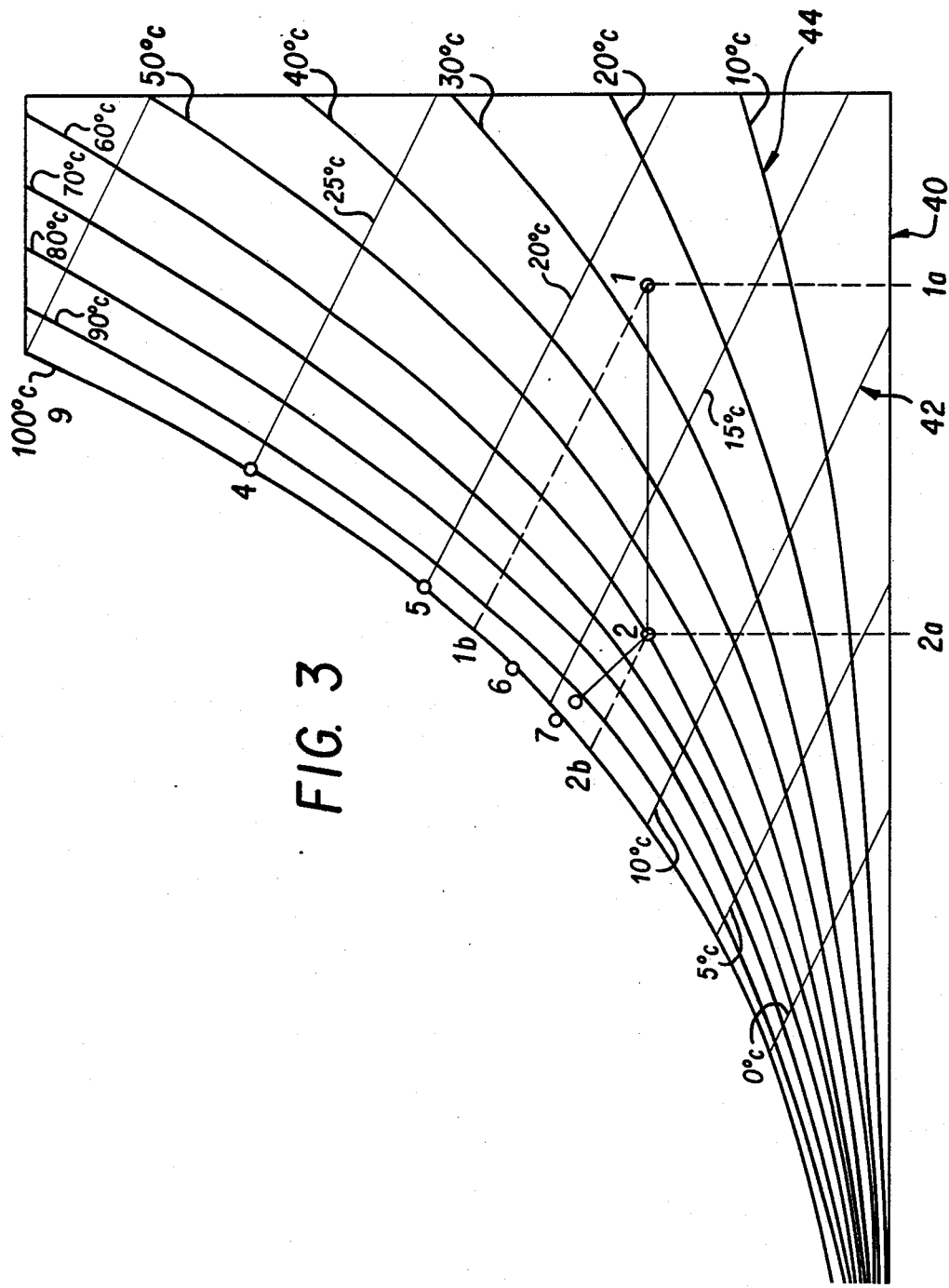
FIG. 3 shows a psychrometric chart illustrating the effects of the cooling apparatus of FIGS. 1 and 2.

The cooling process is graphically illustrated in the psychrometric chart of FIG. 3 which illustrates the cooling process for both embodiments.

In the charts, the dry bulb temperature in, degrees C, is shown on the base line 40 and the wet bulb temperature is shown by numeral 42. The relative humidity 44 is shown as a percentage of moisture absorbed to total moisture that air can be absorbed at the existing dry bulb temperature. The 100% saturation line is used to display the water temperatures of the working fluid (water in this case). The temperature varies throughout the apparatus.

Initially the air entering all three the chambers i.e. primary air chamber 12, intermediate air chamber 18 and secondary air chamber 16 is at condition 1 on the psychrometric chart with an equivalent dry bulb temperature $1a$ and wet bulb temperature $1b$. The primary and intermediate air streams are then cooled to condition 2 with corresponding dry and wet bulb temperatures $2a$ and $2b$, respectively. This cooling occurs in the sensible cooling coil where the water temperature on entering the coil is at a condition 7 (which can be achieved due to the wet bulb temperature of $2b$ of the air which is slightly lower than 7). The working fluid (water) temperature correspondingly rises from condition 7 to condition 4, with 4 slightly lower than $1a$ so that a Log Mean Temperature Difference still exists with the air being cooled from 1 to 2 and the working fluid heated from 7 to 4.

The water at temperature 4 is fed onto the evaporative cooling media pack and due to evaporation of the water as absorbed by the secondary air stream at condition 1 in secondary air chamber 16 cools the water to a temperature slightly above the wet bulb temperature of the air at $1b$ viz 5. The intermediate air at condition 2 with wet bulb $2b$ is now able to cool the water from condition 5 to a temperature above the wet bulb temperature of the intermediate air $2b$, viz 6 in the evaporative cooling media pack in intermediate air chamber 18. Likewise the primary air which is at condition 2, having been cooled in the sensible cooling coil from condition 1 to condition 2 now with a wet bulb temperature of $2b$ is capable of reducing the water temperature from 6 to 7 in the evaporative cooling media pack in the primary air chamber 12.

The primary air is then cooled further to a condition 3 on the psychrometric chart which is well below the equivalent dry bulb condition of $1b$ —the minimum temperature obtainable in single stage evaporative coolers, and by providing for sufficient capacity in the intermediate section, condition 2 may be achieved at a dry bulb temperature lower than the equivalent dry bulb temperature of condition $1b$.

The invention illustrated provides a cooling process and apparatus wherein a working fluid is cooled in an evaporative cooling media pack to obtain a temperature well below the wet bulb temperature of the air that is supplied to the apparatus and is used to achieve pre-cooling of the intermediate air stream. The pre-cooling of the intermediate air stream assits later in the cycle to obtain the desired reduced working fluid temperature whereas the pre-cooling of the primary air stream results in reduced temperatures and moisture content when compared to conventional evaporative cooling systems making these systems more suitable for air conditioning applications.

We claim:
1. A method for cooling and supplying air to a space to be cooled comprising steps of;
   A. passing a secondary air stream in direct heat exchange relationship with a recirculating working fluid in a first humidifying and cooling chamber to evaporatively cool said secondary air stream and said working fluid and discharging said secondary air stream from said first humidifying and cooling chamber;

B. discharging said working fluid from said first humidifying and cooling chamber and passing the working fluid through a primary humidifying and cooling chamber and thereafter collecting said working fluid;

C. recirculating said working fluid through an indirect heat exchanger to said first humidifying and cooling chamber;

D. passing a primary air stream in heat exchange relationship with said indirect heat exchanger to thereby indirectly cool said primary air stream and heat said working fluid and thereafter;

E. passing said primary air stream passing through the indirect heat exchanger through said primary humidifying and cooling chamber in direct heat exchange relationship with said working fluid passing therethrough prior to the working fluid being collected to thereby evaporatively cool said primary air stream and said working fluid, and F. discharging said primary air stream from said primary humidifying and cooling chamber to the space to be cooled.

2. The method of claim 1 including the additional steps of introducing said working fluid discharge from said first humidifying and cooling chamber into an intermediate humidifying and cooling chamber, passing an intermediate air stream in heat exchange relationship with said working fluid within said intermediate humidifying and cooling chamber to thereby evaporatively cool said intermediate air stream and said working fluid, discharging said intermediate air stream from said intermediate humidifying and cooling chamber and discharging said working fluid to said primary humidifying and cooling chamber.

3. The method of claim 2 including the additional step of mixing a portion of said intermediate air stream discharged from said intermediate humidifying and cooling chamber with said primary air stream discharge from said primary humidifying and cooling chamber.

4. The method of claim 2 including the additional step of passing said intermediate air stream in indirect heat exchange relationship with said indirect heat exchanger prior to introducing said intermediate air stream into heat exchange relationship with said working fluid.

5. The method of claim 4 including the additional step of mixing a portion of said intermediate air stream discharged from said intermediate humidifying and cooling chamber with said primary air stream discharged from said primary humidifying and cooling chamber.

6. The method of claim 4 wherein said working fluid is initially sprayed into said first humidifying and cooling chamber.

7. An apparatus for cooling and supplying air to a space to be cooled comprising a first humidifying and cooling chamber, means for introducing a working fluid into said first humidifying and cooling chamber, said first humidifying and cooling chamber having a fluid discharge portion and an air inlet and exhaust openings for introducing a secondary air stream therethrough so as to be in evaporative heat exchange relationship with said working fluid therein, a primary humidifying and cooling chamber having a working fluid inlet for receiving working fluid discharged from said first humidifying and cooling chamber and air inlet and exhaust openings for introducing a primary air stream therethrough so as to be in evaporative heat exchange relationship with said working fluid therein, a sump means mounted in spaced relationship from said fluid inlet of said primary humidifying and cooling chamber so as to receive working fluid which has passed through said primary humidifying and cooling chamber, an indirect heat exchanger, means for passing said working fluid from said sump means through said indirect heat exchanger, and means for introducing said primary air stream into indirect heat exchange with said indirect heat exchanger and subsequently through said primary air stream wtihin said primary humidifying and cooling chamber to the space to be cooled.

8. The apparatus of claim 7 in which said means for introducing said primary air stream includes a blower means, said blower means being mounted so as to simultaneously introduce said secondary air stream into said first humidifying and cooling chamber as said blower means introduces said primary air stream into said primary humidifying and cooling chamber.

9. The apparatus of claim 7 in which said means for introducing said primary air stream into said primary humidifying and cooling chamber includes a blower means mounted within said means for channeling said primary air stream from said primary humidifying and cooling chamber to the space to be cooled, and a second blower means for introducing said second air stream through said first humidifying and cooling chamber.

10. The apparatus of claim 7 including an intermediate humidifying and cooling chamber mounted between said first humidifying and cooling chamber and said primary humidifying and cooling chamber, said intermediate humidifying and cooling chamber including a working fluid inlet and a working fluid outlet, said working fluid outlet communicating with said working fluid inlet of said primary humidifying and cooling chamber, said intermediate humidifying and cooling chamber including an intermediate air inlet and exhaust outlet through which an intermediate air stream may pass.

11. The apparatus of claim 10 in which said indirect heat exchanger extend adjacent to said intermediate air inlet whereof said intermediate air stream passes in heat exchange relationship with said indirect heat exchanger prior to passing through said intermediate humidifying and cooling chamber.

12. The structure of claim 11 including a valve means disposed between said exhaust opening of said intermediate humidifying and cooling chamber and said exhaust opening of said primary humidifying and cooling chamber whereby a portion of the intermediate air stream may be mixed with said primary air stream.

13. The apparatus of the claim 11 in which said means for introducing said working fluid into said first humidifying and cooling chamber includes a spray means, said indirect heat exchanger being connected with said spray means and pump means for recirculating the working fluid from said sump means to said spray means.

14. The apparatus of claim 11 including a cooling media pack disposed within each of said first, intermediate and primary humidifying and cooling chambers.

15. The apparatus of claim 11 in which said means for introducing said primary air stream includes a blower means, said blower means being mounted so as to simultaneously introduce said secondary air stream and said intermediate air stream into said first humidifying and cooling chamber and said intermediate humidifying and cooling chamber respectively, as said blower means introduces said primary air stream into said primary humidifying and cooling chamber.

16. The apparatus of claim 11 in which said means for introducing said primary air stream into said primary humidifying and cooling chamber includes a blower means mounted within said means for channeling said primary air stream from said primary humidifying and cooling chamber to the space to be cooled, and a second blower means for introducing said second air stream and said intermediate air stream through said first humidifying and cooling chamber and said intermediate humidifying and cooling chambers, respectively.

* * * * *